United States Patent [19]

Serre

[11] Patent Number: 5,369,811
[45] Date of Patent: Dec. 6, 1994

[54] VACUUM TOILET SYSTEM WITH ODOR FILTER

[76] Inventor: Gerard Serre, 25 rue de Miraville, F-95200 Sarcelles, France

[21] Appl. No.: 3,536

[22] Filed: Jan. 13, 1993
(Under 37 CFR 1.47)

[30] Foreign Application Priority Data

Feb. 5, 1992 [SE] Sweden .................................. 9200324

[51] Int. Cl.⁵ .......................... E03D 3/10; E03D 9/04
[52] U.S. Cl. ........................................ 4/213; 4/431; 4/210
[58] Field of Search ............... 4/431, 432, 433, 210, 4/213, 218; 454/115, 116, 117; 55/210, 213, 309

[56] References Cited

U.S. PATENT DOCUMENTS

| | | | |
|---|---|---|---|
| 1,276,784 | 8/1918 | McGory et al. | 4/210 |
| 1,417,268 | 5/1922 | McIntyre | 454/116 |
| 1,613,848 | 1/1927 | Riegel | 4/431 |
| 1,749,356 | 3/1930 | Ross . | |
| 1,818,586 | 8/1931 | Schumacher | 4/433 |
| 2,047,067 | 7/1936 | Harris | 4/213 |
| 2,612,186 | 9/1952 | Bolger . | |
| 4,029,487 | 6/1977 | Brandt | 55/309 |
| 4,184,506 | 1/1980 | Varis et al. . | |
| 4,297,751 | 11/1981 | Olin et al. . | |
| 5,133,853 | 7/1992 | Mattson et al. | 4/431 |
| 5,214,807 | 6/1993 | Terve . | |

Primary Examiner—Henry J. Recla
Assistant Examiner—Charles R. Eloshway
Attorney, Agent, or Firm—Smith-Hill and Bedell

[57] ABSTRACT

A vacuum toilet system for a transport vehicle includes a toilet bowl, a sewage collection system, a normally closed sewer valve connecting the toilet bowl to the sewage collection system, a vacuum generator for exhausting air from the sewage collection system to create a partial vacuum in the sewage collection system of a magnitude sufficient for providing effective transport of sewage from the toilet bowl into the sewage collection system, and an odor removal device for removing odiferous material from the air exhausted from the sewage collection system. The odor removal device is disconnected when the transport vehicle is moving at a speed that exceeds a given limit value.

12 Claims, 2 Drawing Sheets

VACUUM TOILET SYSTEM WITH ODOR FILTER

BACKGROUND OF THE INVENTION

The invention relates to a vacuum toilet system intended for installation on a railroad train or other transport vehicle.

Vacuum toilet systems have been in use for many years. Because a vacuum toilet system requires considerably less rinse water than a conventional gravity toilet system and employs small gauge piping and fittings, vacuum toilet systems have proved particularly useful in vehicles for passenger transportation such as aircraft, ships and trains.

Conventionally, a vacuum toilet system comprises at least one toilet bowl connected via a sewer valve to a sewer pipe, the interior of which can be placed under a substantially lower pressure than exists inside the toilet bowl. The sewer pipes feed into a sewage collecting tank, from which the sewage is emptied after a certain period of use of the system. To assist the emptying of the toilet bowl and to improve the cleanliness and hygiene, the toilet bowl is flushed with rinse water that is fed into the toilet bowl in connection with the discharge of the waste contents of the bowl into the sewer pipe.

In order to achieve a satisfactory evacuation of waste from the toilet bowl and to ensure an effective waste transport through the sewer pipe to the collecting tank, a specific level of vacuum is required in the sewer pipe. This vacuum level is normally at least about 40 kPa below the ambient pressure. Normally, small vacuum toilet systems including only a few toilet bowls are used in transport vehicles. Systems of that kind are described, for instance, in patent publications U.S. Pat. No. 4,297,751 and GB 2,243,166. The volume that must be put under vacuum in that kind of system is small enough that the required vacuum is conveniently generated and maintained intermittently, which means that vacuum is generated only in connection with each waste disposal and flushing cycle. Nevertheless, in order to generate the necessary partial vacuum the volume of the air that must be pumped from the sewage disposal system during a flushing cycle is quite large, and the air must be pumped rapidly from the sewage disposal system in order for the flushing cycle to be completed within an acceptable time.

A problem with vacuum toilet systems in transport vehicles is that the air that is pumped out from the sewage disposal system has a foul odor and this foul odor can be bothersome for people standing close to the transport vehicle, especially if the transport vehicle is in a space under roof such as frequently occurs when a railroad train is standing at a station. This problem is particularly severe in the case of a system in which the required vacuum is generated and maintained intermittently, because of the large volume of foul air that is pumped rapidly from the sewage disposal system during a flushing cycle. The problem has earlier been solved by placing a filter in the evacuating duct, but a filter for filtering out odors is relatively expensive and its effective lifetime is relatively short.

SUMMARY OF THE INVENTION

The object of the invention is to considerably lengthen the useful life of an odor filter or other odor removal device installed in a vacuum toilet system without substantial increase in costs.

In accordance with a first aspect of the present invention there is provided a vacuum toilet system for a transport vehicle including a toilet bowl, a sewage collection system, a normally closed sewer valve connected between the toilet bowl and the sewage collection system, a vacuum generator for exhausting air from the sewage collection system to create a partial vacuum in the sewage collection system of a magnitude sufficient for effective transport of sewage from the toilet bowl into the sewage collection system, an odor removal device for removing odoriferous material from the air exhausted from the sewage collection system by the vacuum generator, and means for disconnecting said odor removal device when the transport vehicle is moving at a speed that exceeds a given limit value.

In accordance with a second aspect of the present invention there is provided a method of operating a vacuum toilet system for a transport vehicle, said vacuum toilet system including a toilet bowl, a sewage collection system, a normally closed sewer valve connecting the toilet bowl to the sewage collection system, a vacuum generator arranged to create a partial vacuum in the sewage collection system of a magnitude sufficient for effective transport of sewage from the toilet bowl into the sewage collection system, and an odor removal device for removing odiferous material from the air exhausted from the sewage collection system, said method comprising disconnecting the odor removal device when the transport vehicle is moving at a speed that exceeds a given limit value.

The invention has as its basis the idea that a filter or other odor removal device is only needed when the transport vehicle is at a standstill or is moving very slowly at or close to a station or halting-place. By means of the invention, the useful life of the odor removal device can be considerably increased by minimizing the amount of time that it is actually in use. According to the invention, the filter will normally be used as an odor removal device only on at most 10% of the occasions when air is pumped out from the sewage collection system, which means that the filter may serve ten times longer than if the air pumped out passed through the filter on each of the occasions on which air is pumped from the sewage collection system. Consequently, the invention results in the filter costs, as well as the labor costs for exchange of filter, being considerably reduced.

Instead of using a filter for odor removal other known arrangements are feasible, for instance, gas scrubbers and arrangements for adding odor-suppressing additives. Because such arrangements are known to the expert, the invention is described only with reference to a filter as an odor removal device, but other means providing substantially the same result can also be used within the scope of the invention. With the technology of today, however, the use of filters has been found to be the simplest solution.

When applying the invention a convenient solution is that means for disconnecting the odor removal device are automatically activated when the speed of the transport vehicle exceeds a given limit value. For instance, in railroad trains it is conventional to establish several such limit values to influence different systems in the train. In modern high-speed trains, several systems in the train automatically receive a signal when the train speed is 5 km/h or higher. This signal is automatically turned off when the speed again falls below the given value. At a speed of 40 km/h another signal is given, and this signal blocks the doors of the train so that they cannot be opened. It has proved convenient to use, in such trains, this second signal as a control signal for disconnecting the odor removal device. By choosing a sufficiently high limit value, the foul smelling air pumped out of the sewage collection system by the vacuum generator is dispersed so effectively in the atmospheric air that no problems with foul odor arise.

The most simple way to disconnect the odor removal device is to lead the air pumped out from the sewage collection system through a by-pass duct past the odor removal device. Such an arrangement includes in its simplest form a closure valve in the by-pass duct, which valve is opened when the by-pass duct is to be activated. Because the flow resistance of an open by-pass duct is considerably lower than the flow resistance of a filter or the like, this simple system has a fully satisfactory function. Should, however, the odor removal device have a low flow resistance, it might be desirable to use, instead of a simple closure valve in the by-pass duct, a three-way valve, which is connected to the odor removal device as well as to the by-pass duct. A more secure control is then achieved and this control is independent of the flow resistance in the two flow ducts.

The invention has been found to be especially advantageous in vacuum toilet systems with intermittent vacuum generation. However, the invention may with advantage be applied also to so-called constant vacuum systems, that is, systems where the needed transport vacuum is continuously maintained in the sewer pipe, see for instance, patent publications U.S. Pat. Nos. 4,184,506 and 4,034,421.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
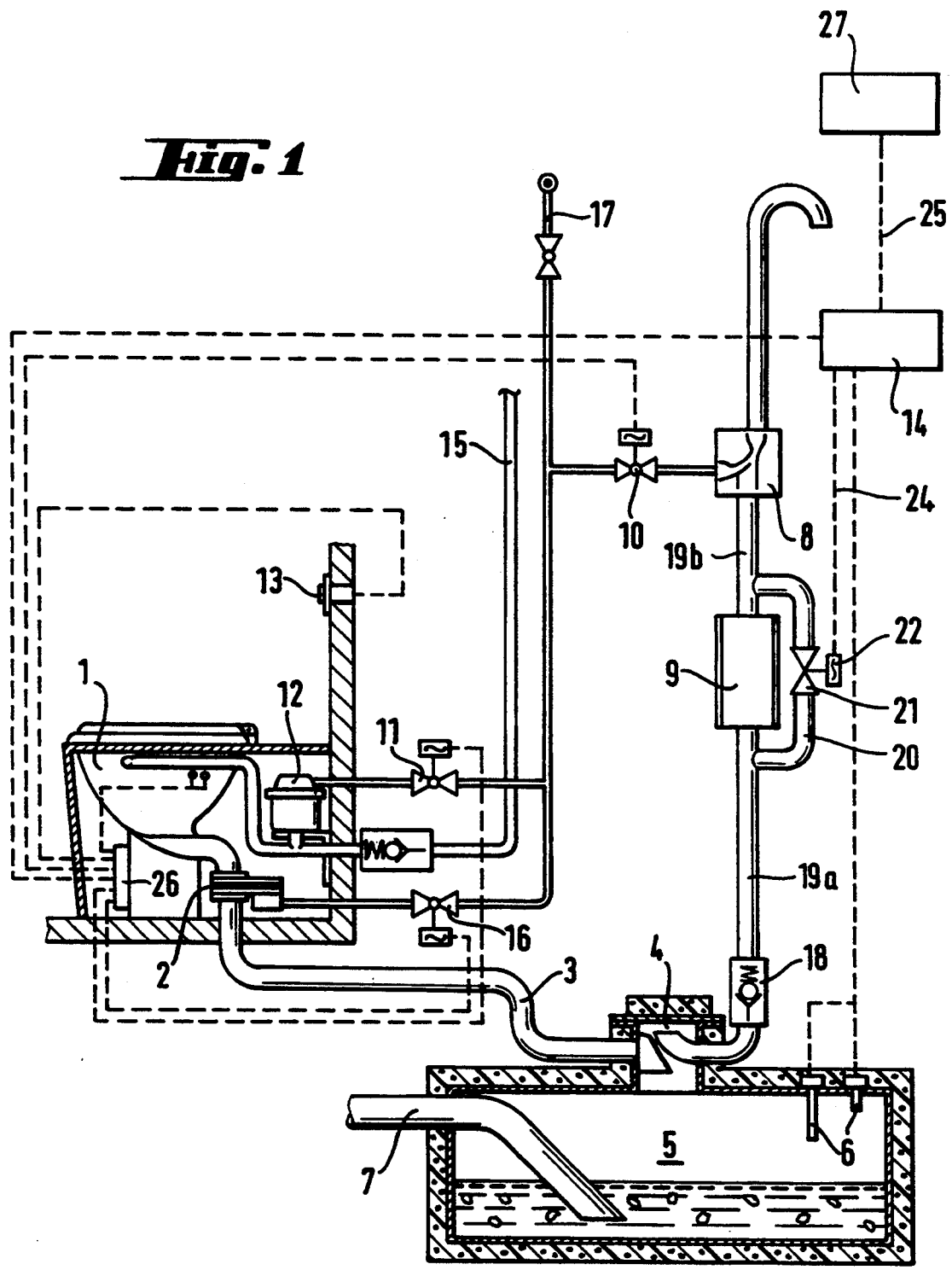
FIG. 1 is a diagrammatic illustration of a vacuum toilet system according to the invention.

The vacuum toilet system illustrated in FIG. 1 has some features in common with that disclosed in U.S. patent application No. 07/688,738 filed Apr. 18, 1991, now U.S. Pat. No. 5,214,807 the disclosure of which is hereby incorporated by reference herein. The vacuum toilet system shown in FIG. 1 is designed for installation in a passenger transport vehicle such as a railroad car or the like.

The vacuum toilet system shown in FIG. 1 comprises a toilet with a bowl 1, connected to a sewer pipe 3 via a normally closed sewer valve 2. The sewer pipe 3 feeds via an air separator 4 into a collecting tank 5, which is fitted with an alarm gauge 6 indicating, for example, when the collecting tank 5 has become filled to such an extent that it requires emptying. The collecting tank 5 can be emptied by connecting it to the atmosphere and simultaneously applying suction to the pipe 7, which is normally closed by means of a closure valve (not shown).

The vacuum producing means is an ejector 8, evacuating the sewer pipe 3 and the tank 5 through a filter 9 and an exhaust duct 19a, 19b. A check valve 18 is provided between the exhaust duct 19a, 19b and the tank 5 to prevent backflow of air into the tank and thereby preserve vacuum in the tank 5 and the sewer pipe 3. The separator 4 separates the air from the discharged sewage mass. The separator 4 can be of a very simple design. Its object is to prevent fluid and dirt from being sucked into the exhaust duct 19a, 19b.

The ejector 8 is operated by compressed air which is fed from a network 17 through a remote controlled solenoid valve 10. Air from the compressed air network 17 is also led via another remote controlled solenoid valve 11 to a pressurizer 12, which pressurizes rinse water received from a water pipe 15 and delivers it to the toilet bowl 1. A third remote controlled solenoid valve 16 releases compressed air for operating the sewer valve 2. A flush knob 13 on the toilet compartment wall is connected through an interface device 26 to a control unit 14 that controls the various functions of the system.

To execute a flushing operation, the flush knob 13 is operated. The flush knob sends an impulse to the control unit 14, which opens the solenoid valve 10, permitting compressed air to pass through the ejector 8, thus generating within a few seconds a sufficient partial vacuum in the collecting tank 5 and sewer pipe 3. The solenoid valve 10 will remain open until the desired vacuum level has been reached. At a fixed time in the operating cycle the valve 11 opens and water is released to the pressurizer 12, which provides the toilet bowl with rinse water under pressure. When the valve 16 opens, compressed air acts on the operating device of the sewer valve 2 so that the sewer valve opens. The waste in the toilet bowl 1 is then forced into the sewer pipe 3 by the difference between the ambient pressure and the partial vacuum induced in the sewer pipe 3 and is transported by this pressure difference to the collecting tank 5.

Further toilet bowls with associated piping and other equipment may be connected to the collecting tank 5 and to the vacuum generating means. However, a system with intermittent vacuum generation is not suitable for a system including a large number of toilet bowls. The number of toilet bowls in such a system is preferably no more than two, and the maximum number is normally four. Through special arrangements the number of toilet bowls can be increased to about ten in a system with intermittent vacuum production, but such a system is relatively complicated.

When a train or the like, equipped with the illustrated vacuum toilet system, is standing at a station, air pumped out through the duct 19a, 19b passes through the filter 9, which removes odoriferous material from the air. The relatively expensive filter 9 is, however, not used when the train is moving at a relatively high speed. In those cases, the air pumped out through the duct 19a, 19b is led through a by-pass duct 20 past the filter 9. This function is achieved by opening a two port closure valve 21 present in the duct 20. Preferably, this valve has a remote-controlled operating device 22, which is controlled from the control device 14 through a connection 24. The train includes a speed sensing device 27 that generates control signals depending on the train's speed. One of these signals is fed to the control device 14 through a connection 25. The speed sensing device might, for reasons not connected with the vacuum toilet system, provide a control signal when, for instance, a speed of 40 km/h is reached, and this control signal may be used to control connection of the by-pass duct 20. Otherwise, a somewhat lower limit value, but preferably at least 20 km/h, might be more convenient.

Figure 2:
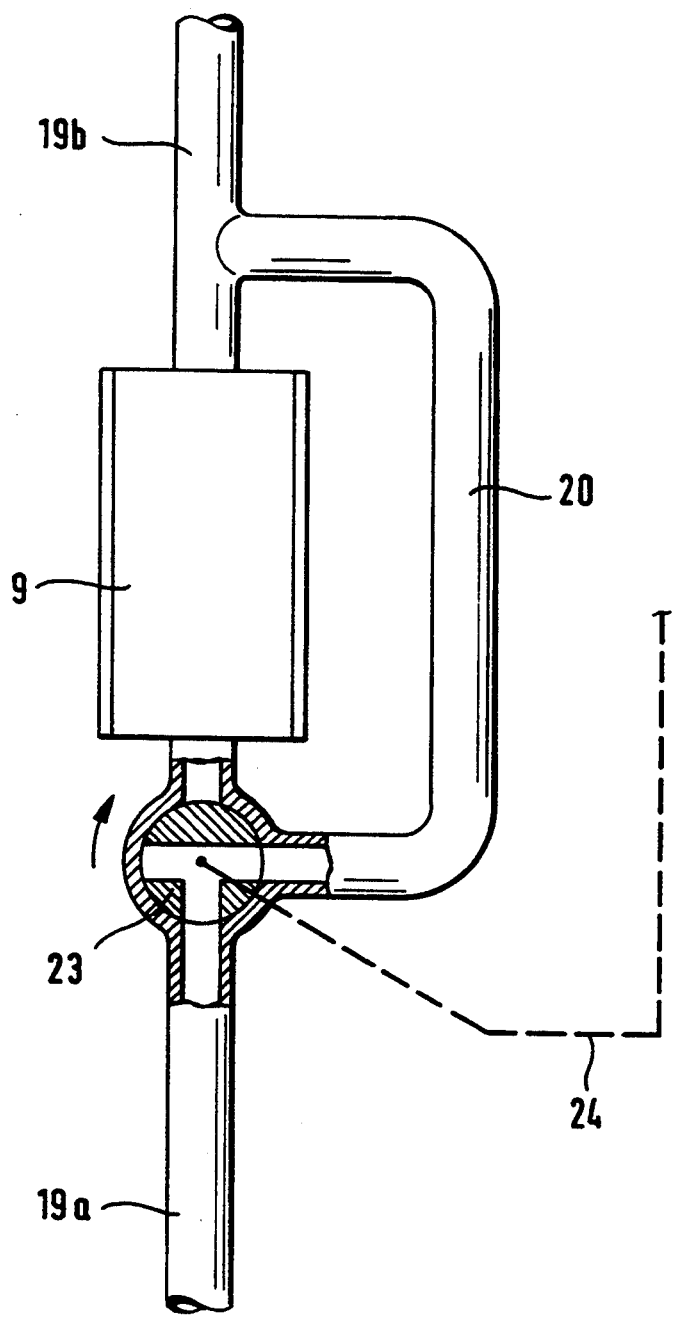
FIG. 2 is an enlarged partial view of a modification of the vacuum system shown in FIG. 1.

If the odor removing device 9 has a very low flow resistance, the mere opening of the valve 21 is not sufficient for providing the required by-pass function. In that case, as shown in FIG. 2, the valve 21 should be replaced by a remote controlled, three-way valve 23, installed at one end of the by-pass duct 20, so that the three-way valve, dependent on its functional position, connects the by-pass duct 20 in the exhaust duct 19a, 19b and closes the flow path through the filter 9 or conversely connects the filter 9 in the exhaust duct 19a, 19b and closes the flow through the by-pass duct 20. A three-way valve connected like this positively determines the flow path of the air and therefore gives a more reliable control of the air flow, but will be somewhat more expensive than the arrangement shown in FIG. 1.

The invention is not limited to the embodiments shown, but several variations and modifications thereof are feasible within the scope of the attached claims. For example, although the invention has been described with reference to a vacuum toilet system installed in a railroad car it is also applicable to other passenger transport vehicles, such as buses. Also, although vacuum is generated intermittently in connection with every toilet emptying in the system shown in FIG. 1, the invention is also applicable to a constant vacuum system, in which the level of partial vacuum in the sewer pipe is monitored by a pressure sensing device and, during normal use of the system, is constantly kept between an upper and a lower limit within a range suitable for the intended sewage transport in the sewer.

I claim:

1. A vacuum toilet system for a transport vehicle including a toilet bowl, a sewage collection system, a normally closed sewer valve connected between the toilet bowl and the sewage collection system, a vacuum generator for exhausting air from the sewage collection system to create a partial vacuum in the sewage collection system of a magnitude sufficient for effective transport of sewage from the toilet bowl into the sewage collection system, an odor removal device for removing odiferous material from the air exhausted from the sewage collection system by the vacuum generator, and means for disconnecting said odor removal device when the transport vehicle is moving at a speed that exceeds a given limit value.

2. A vacuum toilet system according to claim 1, wherein the odor removal device includes a filter.

3. A vacuum toilet system according to claim 1, comprising means for sensing the speed of the transport vehicle and automatically disconnecting the odor removal device when the speed of the transport vehicle exceeds said limit value.

4. A vacuum toilet system according to claim 3, wherein said limit value is at least 20 km/h.

5. A vacuum toilet system according to claim 3, wherein said limit value is about 40 km/h.

6. A vacuum toilet system according to claim 1, wherein the means for disconnecting the odor removal device comprises a by-pass duct connected in parallel with the odor removal device.

7. A vacuum toilet system according to claim 6, wherein air flow resistance of the by-pass duct is considerably lower than that of the odor removal device and the system further comprises a two-port valve connected in the by-pass duct.

8. A vacuum toilet system according to claim 6, comprising an exhaust duct having an upstream portion and a downstream portion and wherein the odor removal device is connected between the upstream portion of the exhaust duct and the downstream portion thereof, and the system further comprises a three-port valve connected to the by-pass duct, the odor removal device and one of said portions of the exhaust duct.

9. A vacuum toilet system according to claim 1, further comprising control means responsive to a toilet flushing impulse to cause the vacuum generator to operate until the partial vacuum necessary for waste transportation has been generated.

10. A method of operating a vacuum toilet system for a transport vehicle, said vacuum toilet system including a toilet bowl, a sewage collection system, a normally closed sewer valve connecting the toilet bowl to the sewage collection system, a vacuum generator for exhausting air from the sewage collection system to create a partial vacuum in the sewage collection system of a magnitude sufficient for effective transport of sewage from the toilet bowl into the sewage collection system, and an odor removal device for removing odiferous material from the air exhausted from the sewage collection system, said method comprising disconnecting the odor removal device when the transport vehicle is moving at a speed that exceeds a given limit value.

11. A method according to claim 10, wherein the transport vehicle includes means for sensing the speed of the transport vehicle and generating a signal representative of the sensed speed, and said method comprises automatically disconnecting the odor removal device when the speed represented by said signal exceeds said given limit value.

12. A method according to claim 10, comprising operating the vacuum generator in response to a flushing impulse until the partial vacuum necessary for waste transportation has been generated and then discontinuing operation of the vacuum generator.

* * * * *